United States Patent
Trinidad et al.

(10) Patent No.: US 6,886,702 B2
(45) Date of Patent: May 3, 2005

(54) KITCHEN UTENSIL STORAGE AND DISPENSATION SYSTEM

(76) Inventors: Thomas G. Trinidad, 10710 W. Pecan Rd., Tolleson, AZ (US) 85353; Maria A. Trinidad, 10710 W. Pecan Rd., Tolleson, AZ (US) 85353

( * ) Notice: Subject to any disclaimer, the term of this patent is extended or adjusted under 35 U.S.C. 154(b) by 0 days.

(21) Appl. No.: 10/328,267

(22) Filed: Dec. 23, 2002

(65) Prior Publication Data

US 2004/0118800 A1 Jun. 24, 2004

(51) Int. Cl.[7] .............................. A47F 5/14; A47F 7/00
(52) U.S. Cl. .................................. 211/181.1; 211/70.6
(58) Field of Search ........................... 211/181.1, 13.1, 211/85.2, 10, 85.31, 119.005, 70.6, 70.7

(56) References Cited

U.S. PATENT DOCUMENTS

| | | | | |
|---|---|---|---|---|
| 5,398,824 A | * | 3/1995 | Wolff et al. | 211/106 |
| D392,163 S | * | 3/1998 | Jenkinson | D7/704 |
| 5,833,080 A | * | 11/1998 | Donne | 211/181.1 |
| D427,831 S | * | 7/2000 | Corley | D6/566 |
| 6,234,330 B1 | * | 5/2001 | Gray | 211/106 |
| D446,414 S | * | 8/2001 | Schafer | D6/553 |
| 6,299,001 B1 | * | 10/2001 | Frolov et al. | 211/106 |
| D459,616 S | * | 7/2002 | Bustos et al. | D6/465 |

* cited by examiner

*Primary Examiner*—Hugh B. Thompson, II
(74) *Attorney, Agent, or Firm*—Tod R. Nissle, P.C.

(57) ABSTRACT

Apparatus for storing and dispensing kitchen articles includes an upstanding grate adapted to hang kitchen articles, to house kitchen articles, and to dispense kitchen articles. The kitchen articles can be stored and dispensed from locations inside of and outside of the grate.

4 Claims, 8 Drawing Sheets

KITCHEN UTENSIL STORAGE AND DISPENSATION SYSTEM

This invention pertains to apparatus and methods for storing and dispensing articles.

More particularly, the invention pertains to a system for storing and utilizing a variety of spoons, napkins, food containers, string, paper towels, aluminum foil, bowls, plates, spices, and other articles commonly found and utilized in a kitchen.

In a further respect, the invention pertains to an improved storage and dispensing apparatus in which an upright portion of the apparatus functions to hang kitchen articles, to enclose and house kitchen articles, and to dispense kitchen articles.

A variety of containers, cup hangers, shelves, cupboards, and drawers are provided in a kitchen to store and dispense articles typically found and utilized in the kitchen. Since counter top and cupboard space typically is at a premium in a kitchen, it would be highly desirable to provide an article storage and dispensation system that would serve multiple functions and require a minimal amount of counter top or cupboard space.

Therefore, it is a principal object of the instant invention to provide an improved apparatus and method for storing and dispensing kitchen articles.

A further object of the invention is to provide an improved storage and dispensation apparatus in which the apparatus structure maximizes the efficient utilization of space and in which the apparatus structure performs multiple functions.

Another object of the invention is to provide an improved storage and dispensation apparatus in which kitchen articles can be stored both inside and outside of the apparatus.

Still a further object of the invention is to provide an improved storage and dispensation apparatus that can be utilized to store and dispense both kitchen utensils and food.

Still another object of the invention is to provide an improved storage and dispensation apparatus from which kitchen articles can be dispensed horizontally, vertically, and laterally.

These and other, further and more specific objects and advantages of the invention will be apparent to those skilled in the art from the following detailed description thereof, taken in conjunction with the drawings, in which:

Briefly, in accordance with the invention, I provide an improved apparatus for storing and dispensing articles used in a kitchen. The apparatus includes an upstanding grate. The grate at least partially circumscribes an inner storage area. The grate includes a plurality of openings each partially circumscribed by a generally horizontally oriented edge, and includes a plurality of fasteners for hanging kitchen articles on the grate from the generally horizontally oriented edges.

In another embodiment of the invention, I provide an improved storage and dispensation apparatus. The apparatus includes an inner storage area; a kitchen article stored in the inner storage area; and an upstanding grate. The grate circumscribes the inner storage area; includes a plurality of primary openings each partially circumscribed by a generally horizontally oriented edge; and, includes at least one auxiliary opening larger than the primary openings and shaped and dimension to dispense the kitchen article from the inner storage area through the auxiliary opening.

In a further embodiment of the invention, I provide an improved method for storing and dispensing a kitchen article. The improved method comprises the steps of providing a storage and dispensation apparatus comprising an upstanding grate including a plurality of primary openings each partially circumscribed by a generally horizontally oriented edge, the grate including an inside and an outside; of securing to the outside of the grate supplemental apparatus for storing and dispensing the kitchen article; of storing the kitchen article in the supplemental apparatus for a selected period of time; and, of dispensing the kitchen article at least in part from the supplemental apparatus.

Figures 1, 2:
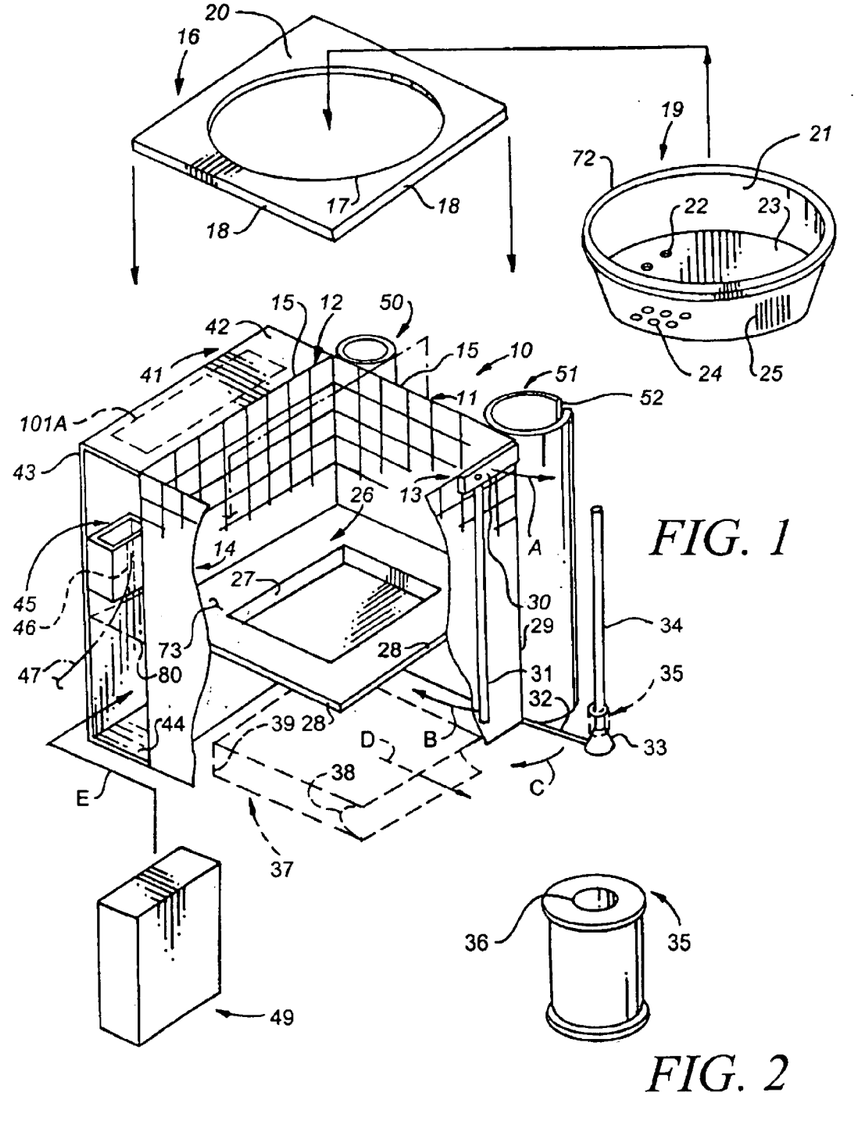
FIG. 1 is a perspective assembly view illustrating a storage and dispensation apparatus constructed in accordance with the principles of the invention.
FIG. 2 is a perspective view illustrating a thread spool stored on the apparatus of FIG. 1 to dispense thread.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates a storage and dispensation apparatus constructed in accordance with the invention and generally identified by reference character 10. Apparatus 10 includes an upstanding grate including rectangular segments or panels 11, 12, 13, 14. The shape of the upstanding grate can vary as desired. For example, the grate can, instead of the orthogonal shape of FIG. 1, have a cylindrical shape. The shape and dimension of the openings in the grate can vary as desired. Each panel 11 to 14 can be clipped or otherwise fastened along its vertical peripheral edges to adjoining panels 11, 12, 13, or 14, as the case may be. Or, the grate can comprise a single long piece rectangular piece bent into the orthogonal shape of FIG. 1.

Each panel 11 to 14 consists of a plurality of spaced apart horizontally oriented bars 55, 56, 65 that are welded or otherwise affixed to a plurality of vertically oriented spaced apart bars 57, 58. Each pair of vertical bars is preferably, but not necessarily, equally spaced. Each pair of horizontal bars 55, 56, 65 is preferably, but not necessarily, equivalently spaced.

Upper, horizontally oriented edge 15 extends around the top of the grate. Orthogonal panel 16 includes peripheral edge 18 that is permanently or removably affixed to edge 15. Panel 16 includes upper surface 20. Circular opening 17 is shaped to received bowl 19 such that circular lip 72 rests on upper surface 20 and the bottom portion of bowl 19 extends downwardly through opening 17.

One function of bowl 19 is to serve as a colander or sieve, which function is enabled by openings 22, 24 formed through the bottom 23 or side 21 of bowl 19. Another function of bowl 19 is to serve as a grating tool, which function is enabled by the grating ribs 25 formed in the side of bowl 19. A further function of bowl 19 is to store fruit or other foodstuffs. Water or other fluids that drain from fruit or other materials stored in bowl 19 drains through openings 22 and 24 and collects in recessed area 27 of panel 26. The peripheral edge 28 of panel 26 is secured to the grate such that panel 26 has the generally horizontal orientation illustrated in FIG. 1 and is generally parallel to panel 16. Panels 16 and 26 are preferably removably attached to the grate to facilitate the removal and cleaning of the panels 16, 26.

U-shaped member 41 can be removably or permanently affixed to a panel 12 or other portion of the grate. Member 41 includes vertically oriented rectangular panel 43 attached along the upper edge of panel 43 to horizontally oriented rectangular panel 42. Panel 43 is attached along its lower edge to horizontally oriented panel 44. Panels 42 and 44 are parallel. Member 41 is shaped and dimensioned such that a box of cereal 49 or other material can be slidably inserted in member 41 in the manner indicated by arrow E for storage. Member 41 can include one or more horizontally oriented shelves 80. A box 45 or other container can be affixed to member 41 to the inside (or to the outside) of member 41. In one embodiment of the invention, a spool 35 is stored in box 45 and the spool 35 turns in box 45 when thread 47 is pulled out of box 45 through an opening 46 formed in box 45. The thread can be used to mend dish towels, pot holders, or other fabric articles used in a kitchen.

An opening can be formed through panel 43 and shaped to enable a box 49 or other article in member 41 to be dispensed from or inserted in member 41 by moving the article through the opening.

Hollow cylindrical container 50 is attached to the outside of the panel 11 of the grate. Container 50 is sized to store aluminum foil or plastic wrap. Container 50 can, if desired, be provided with a vertical slit for dispensing the foil or wrap through the slit. The slit can be provided along its length with serrated teeth to facilitate cutting the foil or plastic wrap.

Hollow cylindrical container 51 is attached to the outside of the panel 11 of the grate. Container 51 is sized to receive a cylindrical roll of paper towels. The towels are pulled or dispensed from container 51 through vertically oriented slit 52. Another paper towel or aluminum foil holder includes arm 30 and leg 31 pivotally attached to the distal end of arm 30. The proximate end of arm 30 is pivotally attached to vertical edge or corner 29 of the grate. Arm 30 pivots along an arcuate path that is indicated by arrow A and that is parallel to the ground. Leg 31 is pivoted upwardly in the direction of arrow B to slid a roll of paper towels onto leg 31, after which leg 31 is pivoted downwardly in a direction opposite that of arrow B to return leg 31—along with the roll of paper towels mounted on leg 31—to the orientation shown in FIG. 1. When there is not a roll of paper towels or other material mounted on leg 31, leg 31 and arm 30 can be stored in the position illustrated in FIG. 1. When there is a roll of paper towels on leg 31, arm 30 and leg 31 are pivoted in the direction of arrow A away from the grate.

The proximate end of arm 32 is also pivotally attached to corner 29 and can be pivoted in the direction of arrow C from the position shown in FIG. 1. The distal end of arm 32 is fixedly attached to conical member 33. Member 33 is shaped and dimensioned such that a plurality of spools having different diameter central openings 36 can be slidably received by leg 34 and rest on and turn on the outer conical surface of member 33. One or more spools can be stored one-on-top-of-the-other on leg 34. A plurality of members 33 can be mounted on leg 34 at spaced apart locations. If desired, member 33 can be shaped like a stepped pyramid such that spools having different sized openings 36 will each rest on a different "step" of the pyramid.

A napkin holder 37 can be removably or fixedly positioned in the inner area or space 73 circumscribed by the grate. Holder 37 includes mouth 38 for removing or inserting napkins in holder 37. Holder 37 can be used in the generally horizontal orientation illustrated in FIG. 2, or can be pivoted upwardly through an arc of 90 degrees and stand on the rectangular bottom 39 of holder 37. To facilitate the use of holder 37 an opening, like rectangular opening 81 in FIG. 3, can be formed through a portion of the grate so that a napkin can be pulled from holder 37 outwardly in the direction of arrow D through opening 81 and through panel 12 or another panel 11, 13, 14 in which an opening 81 is formed. An opening similar to opening 81 can be formed through the grate to facilitate removing a paper towel from holder 51 in the event holder 51 is positioned inside the grate in inner space 73.

Figure 3:
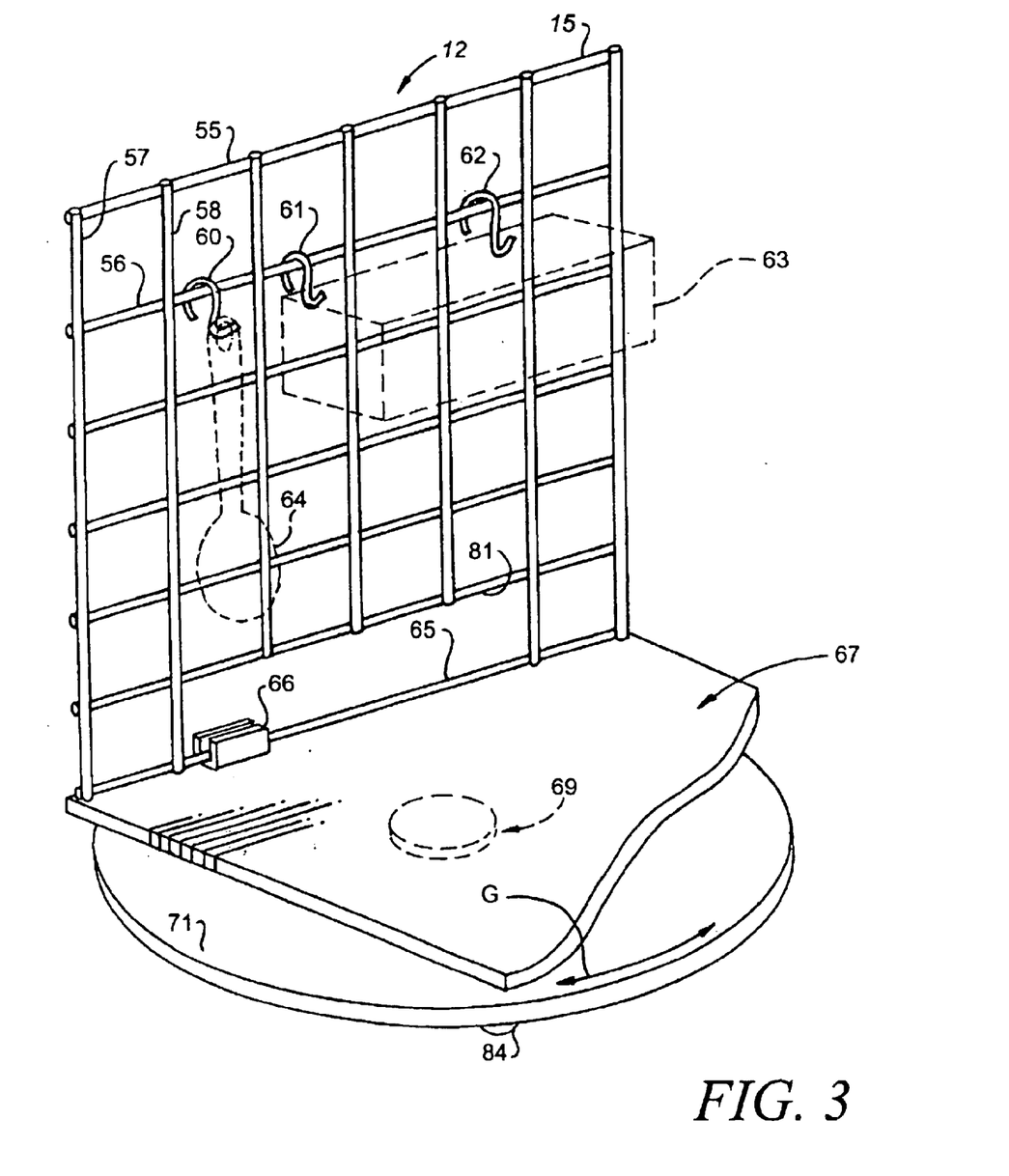
FIG. 3 is a perspective view illustrating the use of a grate wall from the apparatus of FIG. 1 to store and dispense kitchen articles.

In FIG. 3, S-hook fasteners 60 to 62 hang over horizontal edges on bar 56. Fasteners 60 to 62 can, for example, be utilized to support a spoon 64 or container 63.

Clips 66 or other fasteners can be utilized to engage and secure a panel 12 in a desired position on base 67. Ball bearing assembly 69 rotatably secures base 67 to platen 71 such that base 67, and the grate mounted on the base, rotate in the directions indicated by arrow G while platen 71 remains in fixed position. Rubber feet 84 are secured to the bottom of platen 71.

In use, the upstanding grate, including panels 11 to 14, is provided. S-hook fasteners or other fastening means are used to removably or fixedly secure kitchen utensils 64, containers 63, or other articles to the grate. Panels 16 and 26 are installed on the grate. Bowl 19 is installed in opening 17, after the bowl 19 is used as a colander and as a grate and is cleaned. Washed fruit is placed in the bowl. Water from the bowl 19 drains through openings into recess 27. A roll of paper towels is placed in container 51. Another roll of paper towels is placed on leg 31 in the manner earlier described. A roll of aluminum foil is placed in container 50. A cereal box 49 is placed in member 41. Paper towels are placed in holder 37. A thread spool 35 is placed on leg 34 in the manner illustrated in FIG. 1. Paper towels are dispensed through slot 52. Paper towels are pulled off the roll of towels on leg 31. The roll of aluminum foil is removed from container 50 to tear off a piece of foil. The roll is then returned to container 50. Napkins are pulled from holder 37 through an opening 81 in panel 12. The box of cereal 49 is dispensed from member 41 by removing box from member 49 and by opening the box and eating the cereal in the box. A length of thread is pulled off spool 35. Spool 35 rotates around leg 34 when thread is pulled off. The length of thread is cut off spool 35. Fastener 60 is used to hang a spoon 64 on bar 56 in the manner shown in FIG. 3. Fasteners 61 and 62 are used to hang a container 63 on bar 56 in the manner shown in FIG. 3.

The apparatus of FIGS. 1 and 3 can be utilized and adapted to store articles other than kitchen articles. For example, the apparatus can be utilized to store and dispense sewing articles, articles a bar tender would utilize, poker chips and other items used to play games, articles for taking care of a baby, articles used by a golfer, spices, etc.

Figure 4:
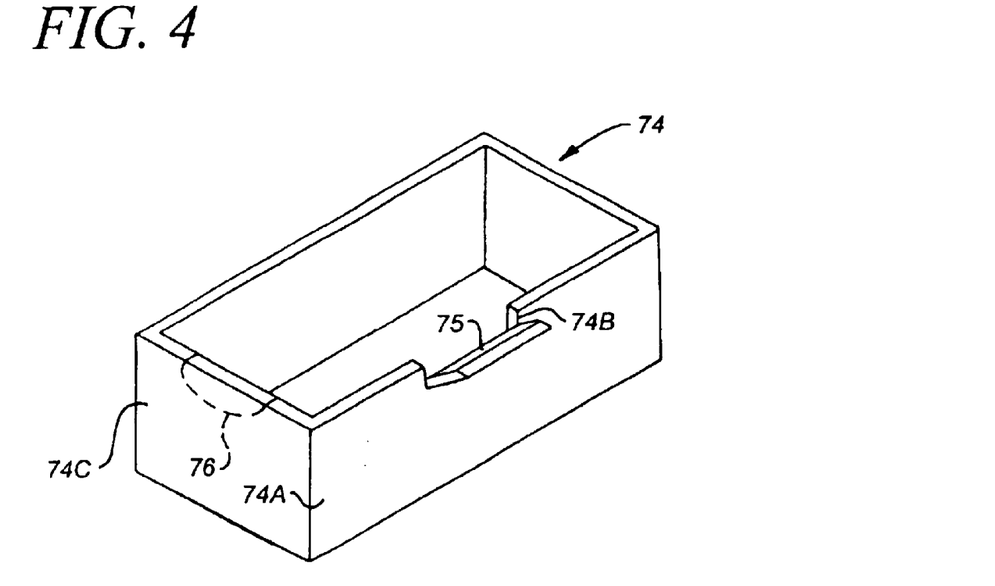
FIG. 4 is a perspective view illustrating a container that can be utilized in conjunction with the apparatus of FIG. 1.

FIG. 4 illustrates a container 74. Container 74 can be mounted on a grate in a manner similar to that of container 63 in FIG. 3, or, can be mounted or positioned at any desired location in or on the apparatus of FIG. 1. Lip 75 depends outwardly from wall 74A and from U-shaped "thumb rest" opening 74B formed in the upper portion of wall 74A. When an individual is attempting to remove an article stored in container 74, the individual can slide his or her thumb through opening 74B and over lip 75 to facilitate the individual's sliding his or her thumb underneath the articles. Alternatively, as indicated by dashed lines 76, a "thumb rest" opening can be formed in the top portion of a side 74C without utilizing an outwardly projecting lip 75.

Figure 5:
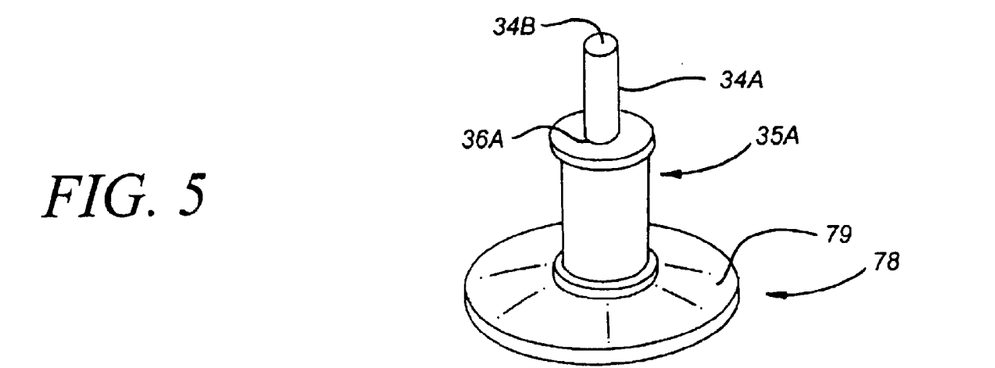
FIG. 5 is a perspective view illustrating a thread storage device that can be utilized in conjunction with the apparatus of FIG. 1.
Figure 6:
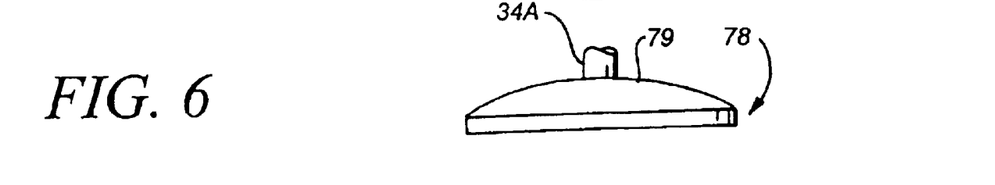
FIG. 6 is a partial side view of the thread storage device of FIG. 5.

FIGS. 5 and 6 illustrate an alternate construction for storing and facilitating the use of thread bobbins or spools. The construction includes a base 78. Base 78 has a convex upper surface 79. The curvature of upper surface 79 facilitates the support by surface 79 of bobbins having differing diameters, and also minimizes the surface area of 79 that contacts the bottom of a bobbin 35A. Minimizing the area of surface 79 contacting the bottom of a bobbin facilitates rotation of the bobbin on stationary surface 79. An upstanding rod 34A is fixedly connected to base 78 and slidably rotatably receives bobbins 35A. A second base 78 can be provide with a cylindrical opening formed in the bottom of base 78 so it can be removably slidably stacked on and removed from top 34B of rod 34A. Base 78 can be mounted on the distal end of arm 32 or can be mounted or positioned at any other desired location in the apparatus of FIG. 1.

Figure 7:
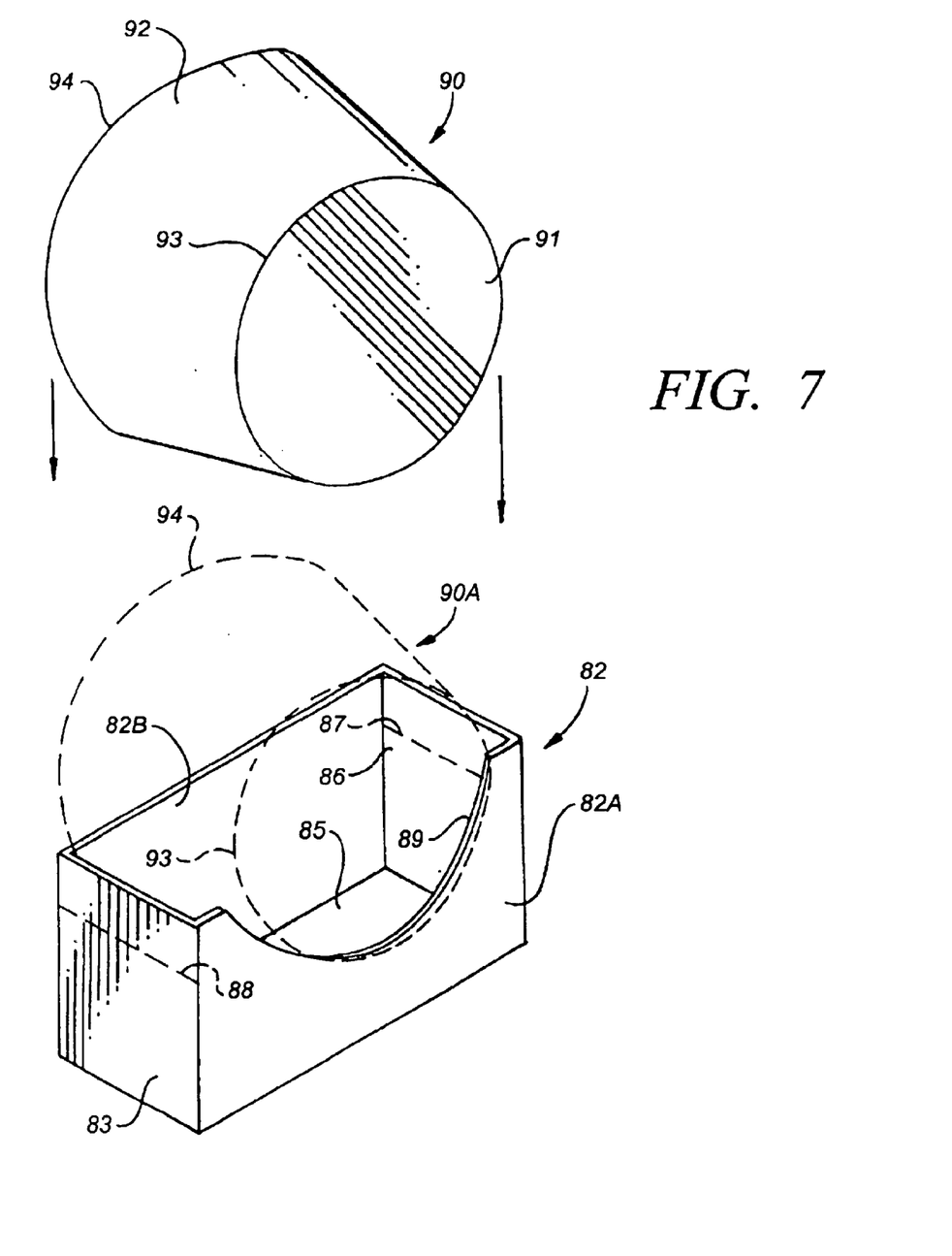
FIG. 7 is an exploded perspective assembly view illustrating bowl storage apparatus that can be utilized in conjunction with the apparatus of FIG. 1 and illustrating the mode of operation thereof.

The bowl storage container 82 illustrated in FIG. 7 includes front 82A, back 82B, sides 83 and 86, and bottom 85. U-shaped, generally semi-circular edge 89 is formed in front 82A. Container 82 is shaped and dimensioned such that when a bowl 90 is inserted in the container in the manner indicated by dashed lines 90A, the upper lip 94 of bowl 90 rests against back 82B, a portion of outer wall 92 seats on edge 89, and the bottom 91 and the bottom circular edge 93 of bowl 90 extend outwardly away from front 82A. If desired, the portion of side 83 intermediate dashed line 88 and bottom 85 can be cut out and discarded such that there is an opening in container 82 between dashed line 88 and bottom 85. Similarly, the portion of side 86 between dashed line 87 and bottom 85 can be cut out and discarded such that there is an opening in container 82 between dashed line 87 and bottom 85.

Figure 8:
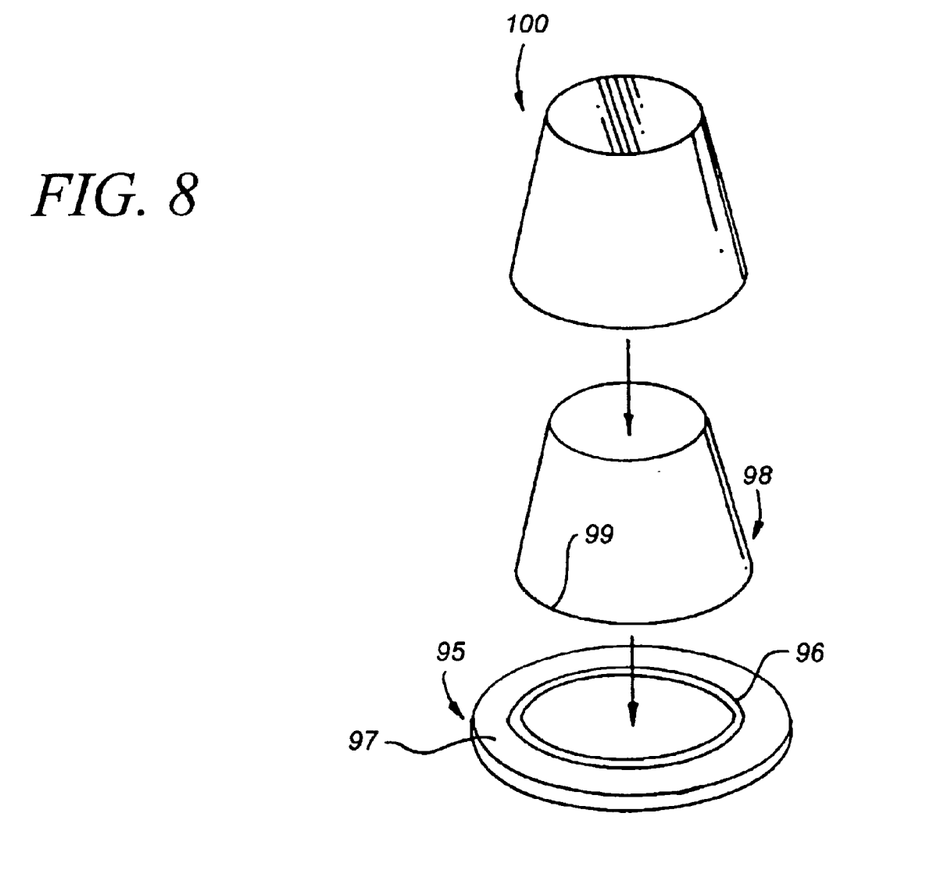
FIG. 8 is an exploded perspective assembly view illustrating a cup storage platform that can be utilized in conjunction with the apparatus of FIG. 1 and illustrating the mode of operation thereof.
Figure 9:
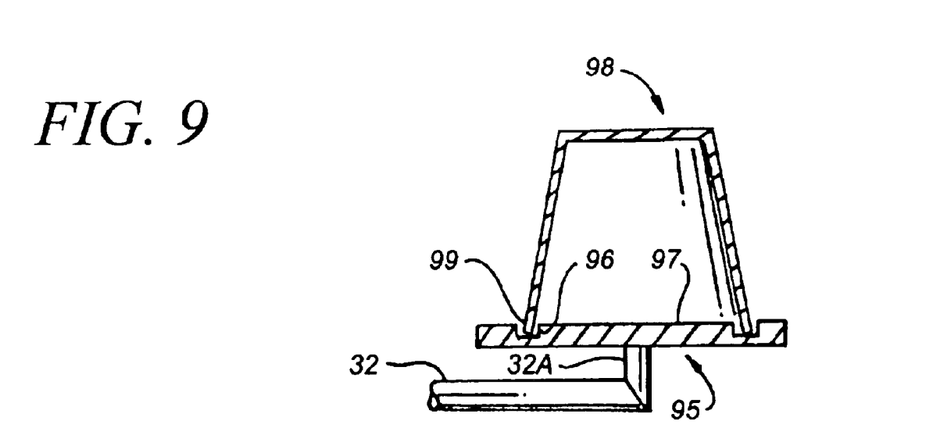
FIG. 9 is a side view illustrating further constructions details of the cup storage apparatus of FIG. 8.

The cylindrical cup storage panel member 95 illustrated in FIG. 8 includes upper circular surface 97 and circular groove 96 formed therein. Groove 96 is shaped and dimensioned that the circular lip 99 of a cup 100 slidably removably fits in groove 96. Groove 96 is preferably, but not necessarily, shaped and dimensioned such that lip 99 fits snugly in groove 96 and will not come out of groove 96 until cup 98 is grasped and pulled from groove 96. When lip 99 is securely anchored in groove 96, cup 98 functions as an anchor that securely holds other cups 100 that are stacked and nested on cup 98. As indicated in FIG. 9, member 95 can be mounted on shaft 32A connected to arm 32.

Figure 10:
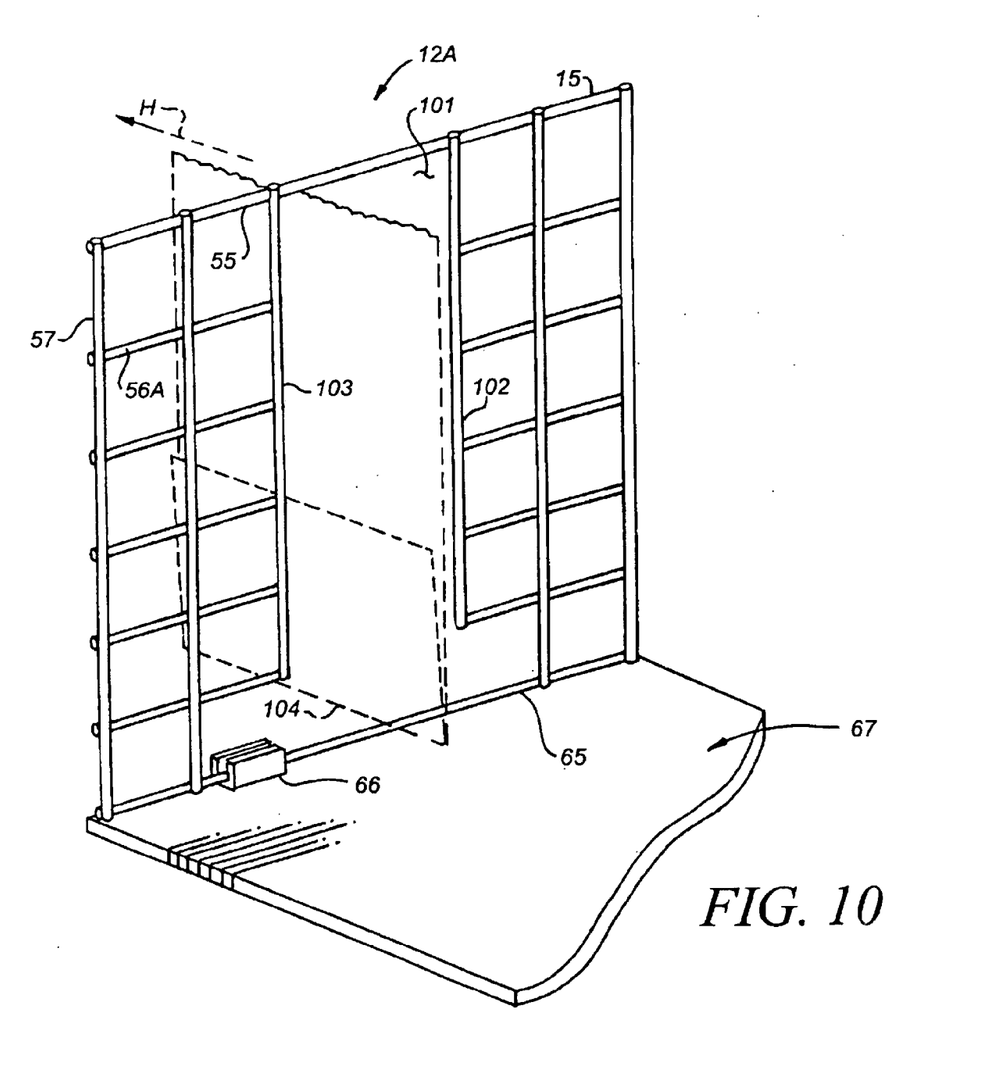
FIG. 10 is a perspective view illustrating the modification of a wire grate wall of the apparatus of FIG. 1 in order to adapt the apparatus to store and dispense paper bags in an upright orientation.

A grate panel 12 can be adapted in the manner indicated by reference character 12A in FIG. 10. Panel 12A has the same general structure as panel 12 and—like panel 12—includes bars 55, 57, 65. However, in panel 12A the length of some of the horizontal bars is—in the manner of bar 56A—shortened and one of the vertical bars is eliminated such that vertically oriented bars 102 and 103 can be utilized to form a vertically oriented opening 101 extending between bars 55 and 65. Opening 101 permits paper bags 104 to be pulled outwardly (or inwardly) from inside the apparatus of FIG. 1 and through opening 101 in the manner indicated by arrow H. U-shaped member 41 can also, if desired, be utilized to store and dispense paper bags 104. For example, paper bags can be inserted in (and removed from) member 41 through an open side in the manner indicated by arrow E. Or, an opening—indicated by dashed lines 101A in FIG. 2—can be formed through the top of member 41 to permit paper bags or other articles to be inserted in and removed from member 41. Similarly, an opening(s) can be formed through side 43 to permit the insertion and removal of paper bags from member 41.

Figure 11:
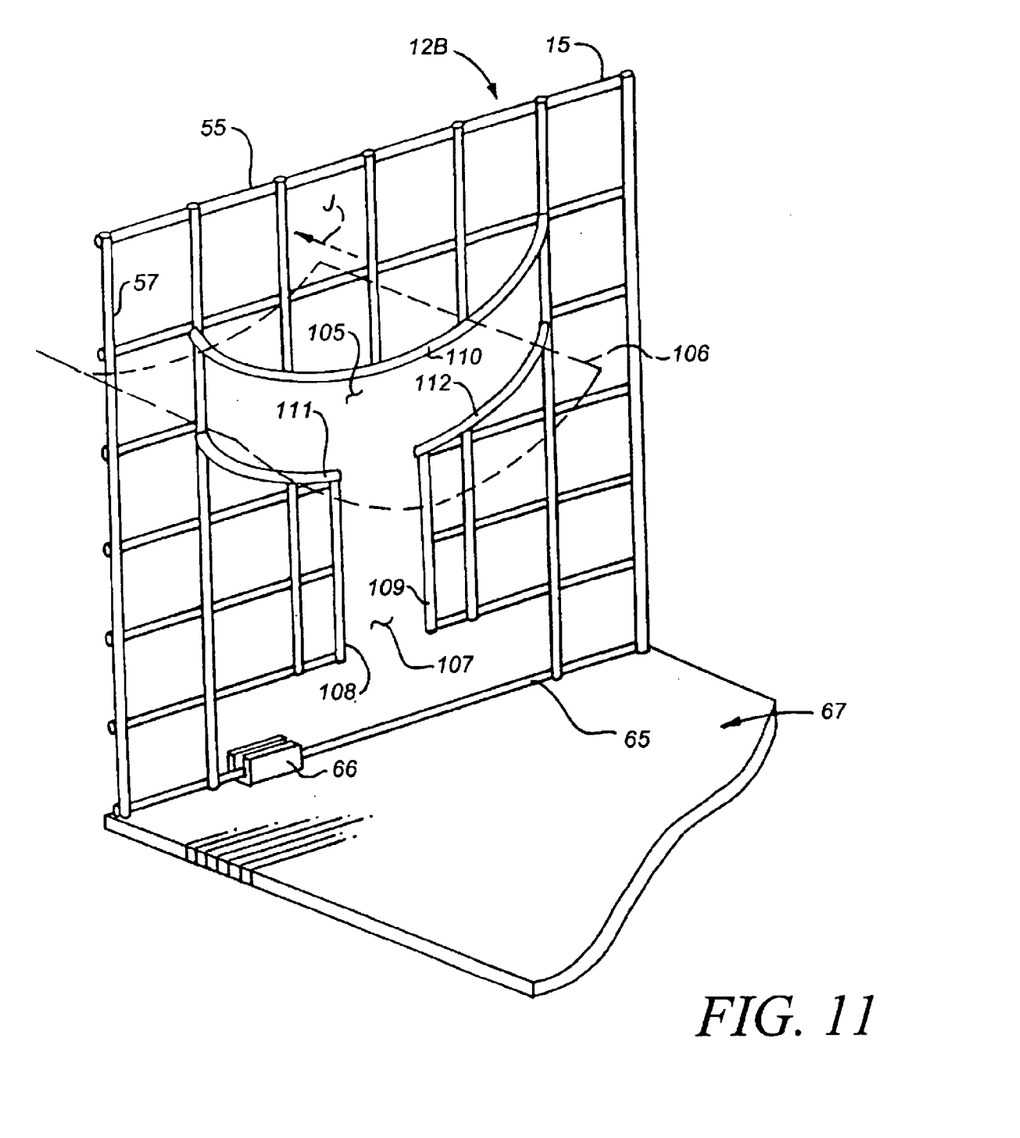
FIG. 11 is a perspective view illustrating the modification of a wire grate wall of the apparatus of FIG. 1 in order to adapt the apparatus to store and dispense paper napkins.

A grate panel 12 can be adapted in the manner indicated by reference character 12B in FIG. 11. Panel 12B has the same general structure as panel 12 and—like panel 12—includes bars 55, 57, 65. However, in panel 12B portions of certain horizontal and vertical bars in panel 12 are eliminated to form U-shaped opening 105 and rectangular vertically oriented opening 107. Vertical opening 107 is bounded in either side by vertical bars 108 and 109. U-shaped opening 105 is bounded by arcuate bar 110 on the top and by arcuate bars 111 and 112 on the bottom. The arcuate shape of opening 105 prevents napkins stored within panels 10 to 14 from easily sliding out through opening 105. Napkins can not easily slide through opening 105 because the opening 105 is arcuate and the napkins are flat. A user inserts his or her fingers through opening 105 and/or 107, grasps one or more napkins 106, bends the napkin 106 with her and her fingers into an arcuate U-shape illustrated by dashed lines 106 in FIG. 11 so that the napkin will readily pass through opening 105, and withdraws the napkin 106 outwardly through opening 105 in the direction indicated by arrow J.

Figure 12:
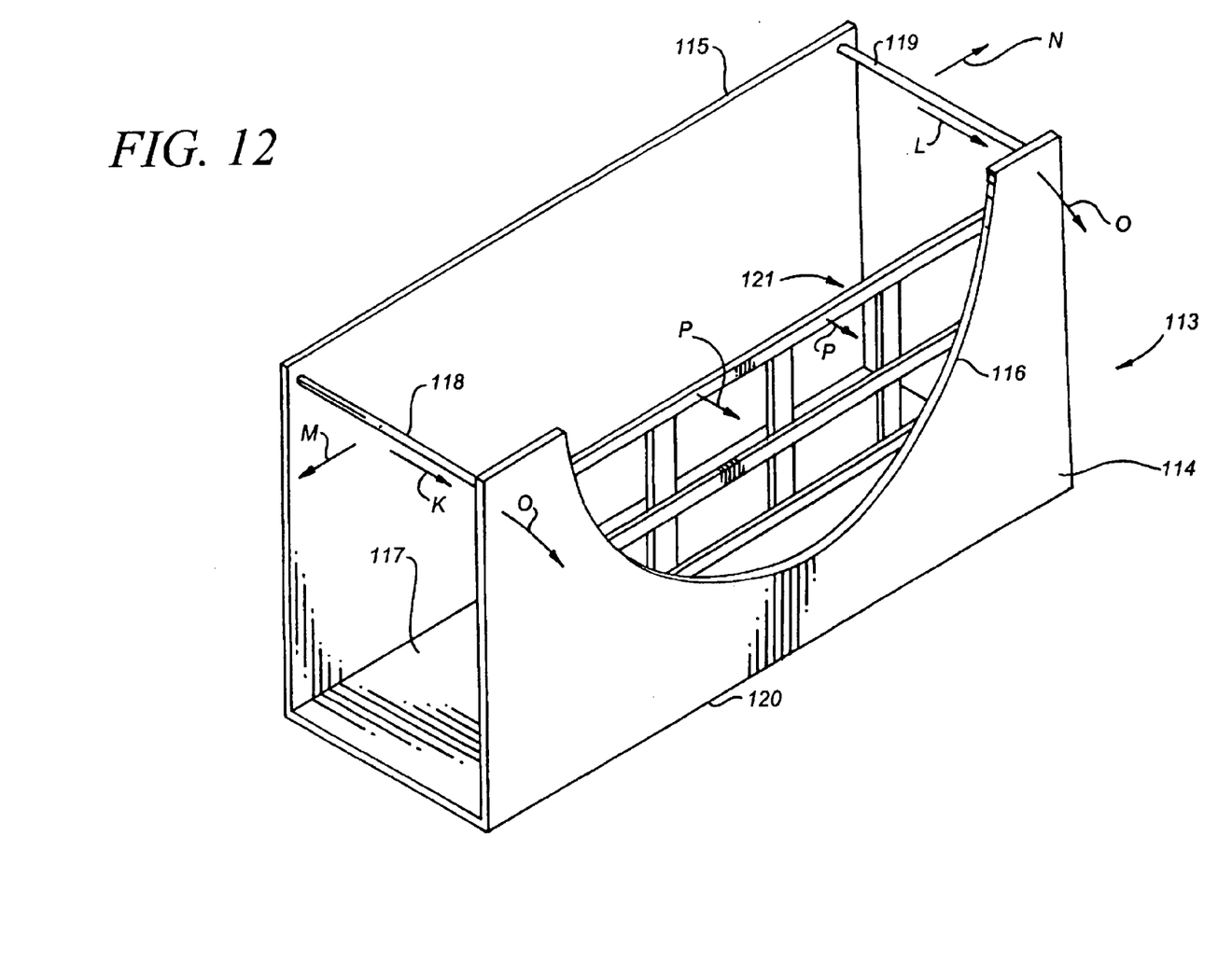
FIG. 12 is a perspective view illustrating a plate/bowl storage container that can be utilized in conjunction with the apparatus of FIG. 1.

FIG. 12 illustrates a container 113 adapted to store plates and bowls. Container 113 includes front 114, back 115, and bottom 117. Arcuate lip 116 is formed in front 114. Lip 116 and back 115 function in a manner similar to that of the bowl holder of FIG. 7, i.e., when a bowl is stored in container 113, the upper lip 94 of the bowl contacts back 115 and the bottom 91 of the bowl extends outwardly past lip 116 such that the bottom of the bowl nests adjacent lip 116. Elastic mesh or netting 121 can be resiliently stretched outwardly in the direction of arrow P when a bowl is stored in container 113 and can also support plates placed on edge on bottom 117 in a vertical orientation. Elastic member 118 can be stretched in the directions of arrows M and K. Elastic member 119 can be stretched in the directions indicated by arrows L and N. Front 114 can pivot about line of weakening 120 in the direction indicated by arrows O. When front 114 pivots in the direction of arrows O, members 118 and 119 stretch in the directions indicated by arrows K and L, respectively. When oversized plates are placed in container 113, member 118 and 119 can be stretched in the direction indicated by arrows M and N, respectively, to accommodate the plates unless the plates are unusually large.

Having described my invention in such terms as to enable those of skill in the art to make and practice it, and having described the presently preferred embodiments thereof.

We claim:

1. An apparatus for storing and dispensing articles used in a kitchen comprising (a) an inner storage area;
(b) a vertically oriented grate
  (i) having an inside and an outside, said inside of said grate circumscribing said inner storage area,
  (ii) including a plurality of primary grate openings each circumscribed by a pair of generally horizontally oriented edges and a pair of vertically oriented edges,
  (iii) having an open top such that kitchen articles can be vertically moved through said open top into and out of said inner storage area,
  (iv) including at least one auxiliary opening larger than said primary grate openings and shaped and dimensioned to dispense laterally kitchen articles from said inner storage area through said auxiliary opening;
(c) a plurality of removable fasteners (60, 61) for hanging kitchen articles (63, 64) on said inside of said grate from said generally horizontally oriented edges;
(d) a panel member (16) mounted on said grate inside said inner storage area and including an opening (17) formed therein; and,
(e) a bowl (19) removably mounted in said opening (17) for removal upwardly through said open top.

2. A kitchen apparatus for storing and dispensing kitchen utensils and perishable food, comprising
(a) an inner storage area;
(b) a vertically oriented grate
  (i) having an inside and an outside, said inside of said grate circumscribing and adjacent said inner storage area,
  (ii) including a plurality of primary grate openings each circumscribed by a pair of generally horizontally oriented edges and a pair of vertically oriented edges,
  (iii) having an open top such that kitchen articles can be vertically moved through said open top into and out of said inner storage area,
  (iv) including at least one auxiliary opening larger than said primary grate openings and shaped and dimensioned to dispense laterally kitchen articles from said inner storage area through said auxiliary opening;
(c) a panel member (16) mounted on said grate inside said inner storage area and including an opening (17) formed therein;
(d) a bowl (19) removably mounted in said opening (17) for removal upwardly through said open top and having perforations formed therethrough;
(e) perishable food in said bowl;
(f) a basin mounted on said grate inside said inner storage area beneath said panel member (16) and said perforated bowl (19) to catch liquids draining from said bowl (19) through said perforations;
(g) a dispenser (37) removably stored in said inner space, said one auxiliary opening being shaped and dimensioned to permit said dispenser to be dispensed in a lateral direction (D) outwardly from said inner space;
(h) a dispenser (50, 51) on said outside of and connected to said grate to store a roll of sheet material and dispense sheet material from said roll; and,
(i) a dispenser (32) pivotally attached to and on said outside of said grate to store and dispense articles.

3. An apparatus for storing and dispensing articles used in a kitchen comprising
(a) an inner storage area;
(b) a vertically oriented grate
  (i) having an inside and an outside, said inside of said grate circumscribing said inner storage area,
  (ii) including a plurality of primary grate openings each circumscribed by a pair of generally horizontally oriented edges and a pair of vertically oriented edges,
  (iii) having an open top such that kitchen articles can be vertically through said open top into and out of said inner storage area,
  (iv) including at least one auxiliary opening larger than said primary grate openings and shaped and dimensioned to dispense laterally kitchen articles from said inner storage area through said auxiliary opening;
(c) a panel member (16) mounted on said grate inside said inner storage area and including an opening (17) formed therein;
(d) a bowl (19) removably mounted in said opening (17) for removal upwardly through said open top and having perforations therethrough; and,
(e) a basin mounted on said grate inside said inner storage area beneath said panel member (16) and said perforated bowl (19) to catch liquids draining from said bowl (19) through said perforations.

4. An apparatus for storing and dispensing articles used in a kitchen comprising
(a) an inner storage area;
(b) a vertically oriented grate
  (i) having an inside and an outside, said inside of said grate circumscribing said inner storage area,
  (ii) including a plurality of primary grate openings each circumscribed by a pair of generally horizontally oriented edges and a pair of vertically oriented edges,
  (iii) having an open top such that kitchen articles can be vertically moved through said open top into and out of said inner storage area,
  (iv) including at least one auxiliary opening larger than said primary grate openings and shaped and dimensioned to dispense laterally kitchen articles from said inner storage area through said auxiliary opening;
(c) a panel member (16) mounted on said grate inside said inner storage area and including an opening (17) formed therein;
(d) a bowl (19) removably mounted in said opening (17) for removal upwardly through said open top;
(e) a basin mounted on said grate inside said inner storage area beneath said panel member (16) and said bowl (19); and,
(f) a napkin holder (37) removably stored in said inner space, said one auxiliary opening being shaped and dimensioned to permit said napkin holder to be dispensed in a lateral direction (D) outwardly from said inner space.

* * * * *